(12) United States Patent
Isobe et al.

(10) Patent No.: US 11,153,068 B2
(45) Date of Patent: Oct. 19, 2021

(54) ENCRYPTION DEVICE, ENCRYPTION METHOD, DECRYPTION DEVICE AND DECRYPTION METHOD

(71) Applicant: SONY CORPORATION, Tokyo (JP)

(72) Inventors: Takanori Isobe, Tokyo (JP); Harunaga Hiwatari, Kanagawa (JP); Kyoji Shibutani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 255 days.

(21) Appl. No.: 16/086,505

(22) PCT Filed: May 11, 2017

(86) PCT No.: PCT/JP2017/017869
§ 371 (c)(1),
(2) Date: Sep. 19, 2018

(87) PCT Pub. No.: WO2017/203992
PCT Pub. Date: Nov. 30, 2017

(65) Prior Publication Data
US 2019/0103957 A1    Apr. 4, 2019

(30) Foreign Application Priority Data

May 23, 2016   (JP) .............................. JP2016-102869

(51) Int. Cl.
*H04L 9/06*    (2006.01)
*G09C 1/00*    (2006.01)
(Continued)

(52) U.S. Cl.
CPC .............. *H04L 9/0631* (2013.01); *G09C 1/00* (2013.01); *H04L 9/002* (2013.01); *H04L 9/302* (2013.01);
(Continued)

(58) Field of Classification Search
CPC . H04L 9/0631; H04L 9/302; H04L 2209/043; H04L 2209/16; H04L 9/002; G09C 1/00
See application file for complete search history.

(56) References Cited

U.S. PATENT DOCUMENTS 5,142,579 A * 8/1992 Anderson ............. H04L 9/3093
                                                       380/285
5,146,500 A * 9/1992 Maurer .................... G06F 7/725
                                                        380/28
(Continued)

FOREIGN PATENT DOCUMENTS

| JP | 2010-510539 A | 4/2010 |
|---|---|---|
| JP | 2011-514091 A | 4/2011 |
| JP | 2012-520589 A | 9/2012 |

OTHER PUBLICATIONS

May 14, 2019, European Search Report issued for related EP Application No. 17802587.0.
(Continued)

*Primary Examiner* — Ali S Abyaneh
*Assistant Examiner* — Shu Chun Gao
(74) *Attorney, Agent, or Firm* — Paratus Law Group, PLLC

(57) ABSTRACT

There is provided an encryption device to suppress calculation in the reverse direction in whitebox model encryption. The encryption device includes: having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values; and having a property of encrypting a part of the plurality of output values according to the trapdoor one-way function, and the trapdoor one-way (Continued)

function not being able to decrypt encrypted data in a state in which a trapdoor is unknown.

14 Claims, 12 Drawing Sheets

(51) Int. Cl.
    *H04L 9/00*     (2006.01)
    *H04L 9/30*     (2006.01)

(52) U.S. Cl.
    CPC .... *H04L 2209/043* (2013.01); *H04L 2209/16* (2013.01)

(56) References Cited

U.S. PATENT DOCUMENTS

| | | | |
|---|---|---|---|
| 5,493,614 A * | 2/1996 | Chaum | H04L 9/3221 380/28 |
| 6,345,101 B1 | 2/2002 | Shukla | |
| 9,906,360 B2 * | 2/2018 | Johnson | H04L 9/0618 |
| 2005/0157871 A1 * | 7/2005 | Komano | H04L 9/3247 380/28 |
| 2016/0050065 A1 | 2/2016 | Michiels et al. | |
| 2018/0351731 A1 * | 12/2018 | Karame | H04L 9/0637 |

OTHER PUBLICATIONS

Coron et al., Optimal Chosen-Ciphertext Secure Encryption of Arbitrary-Length Messages, Jan. 26, 2002, pp. 1-23, International Association for Cryptologic Research.

Chow et al., White-Box Cryptography and an AES Implementation, 99th Annual Workshop on Selected Areas in Cryptography (SAC '02), Aug. 15-16, 2002, pp. 1-18.

Chow et al., A White-Box DES Implementation for DRM Applications, ACM DRM-2002 workshop, Oct. 15, 2002, pp. 1-16.

* cited by examiner

ENCRYPTION DEVICE, ENCRYPTION METHOD, DECRYPTION DEVICE AND DECRYPTION METHOD

CROSS REFERENCE TO PRIOR APPLICATION

This application is a National Stage Patent Application of PCT International Patent Application No. PCT/JP2017/017869 (filed on May 11, 2017) under 35 U.S.C. § 371, which claims priority to Japanese Patent Application No. 2016-102869 (filed on May 23, 2016), which are all hereby incorporated by reference in their entirety.

TECHNICAL FIELD

The present disclosure relates to an encryption device, an encryption method, a decryption device and a decryption method.

BACKGROUND ART

In related art, for example, in non-patent literature 1 and 2, a method is disclosed in which an existing block cipher is converted so as to be secure even in a whitebox model. The method disclosed in non-patent literature 1 and 2 relates to a technique for whitebox implementation of an existing algorithm (DES, AES) that, by converting an operation to a large table reference and embedding a secret key in the table, ensures security even when an internal operation is viewed from the outside.

CITATION LIST

Non-Patent Literature

Non-Patent Literature 1: S. Chow, P. Eisen, H. Johnson, P. C. van Oorschot "A Whitebox DES Implementation for DRM Applications." DRM 2002
Non-Patent Literature 2: S. Chow, P. Eisen, H. Johnson, P. C. van Oorschot "Whitebox Cryptography and an AES Implementation?" SAC 2002

DISCLOSURE OF INVENTION

Technical Problem

The methods described in Non-Patent Literature 1 and 2 perform encryption by a table operation in a whitebox model. In general, calculating table reference based operations in a reverse direction is easy. In other words, in the case where an attacker is able to access an encryption function Enc, the attacker is able to construct a decryption function, which is an inverse function. Consequently, with the techniques described in Non-Patent Literature 1 and 2, it is difficult to sufficiently ensure the security that must be satisfied.

Therefore, in whitebox model encryption there is a need to suppress calculation in the reverse direction.

Solution to Problem

According to the present disclosure, there is provided an encryption device including: a conversion function having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values; and the trapdoor one-way function having a property of encrypting a part of the plurality of output values, and not being able to decrypt encrypted data in a state in which a trapdoor is unknown.

In addition, according to the present disclosure, there is provided an encryption method including: having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values; and having a property of encrypting a part of the plurality of output values according to the trapdoor one-way function, and the trapdoor one-way function not being able to decrypt encrypted data in a state in which a trapdoor unknown.

In addition, according to the present disclosure, there is provided a decryption device including: a decryption unit that decrypts a plurality of input values and outputs a plurality of output values configured of plain text. The decryption unit performs decryption by an inverse operation of a conversion function having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values, and the trapdoor one-way function having a property of encrypting a part of the plurality of output values, and not being able to decrypt encrypted data in a state in which a trapdoor is unknown.

In addition, according to the present disclosure, there is provided a decryption method, including: decrypting a plurality of input values and outputting a plurality of output values configured of plain text. The decryption method performs decryption by an inverse operation of a conversion function having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values, and the trapdoor one-way function having a property of encrypting a part of the plurality of output values, and not being able to decrypt encrypted data in a state in which a trapdoor is unknown.

Advantageous Effects of Invention

According to the present disclosure as described above, it is possible to suppress calculation in the reverse direction in a whitebox model.

Note that the effects described above are not necessarily limitative. With or in the place of the above effects, there may be achieved any one of the effects described in this specification or other effects that may be grasped from this specification.

MODE FOR CARRYING OUT THE INVENTION

Figure 1:
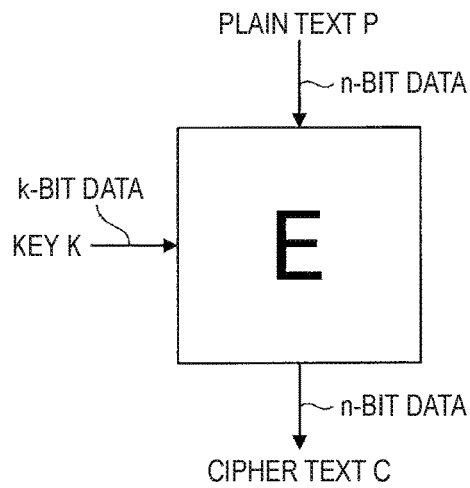
FIG. 1 is a schematic diagram illustrating an n-hit common key block encryption algorithm E corresponding to a k-bit key length.

Hereinafter, a preferred embodiment of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be performed in the following order:
1. Premise Technique
2. Basic Configuration Example of the Embodiment(s)
3. Configuration Example of the Embodiment(s)
4. A Trapdoor One-way Function
5. Conversion Function Having a Special Property
6. Specific Configuration Example of a Whitebox Encoding Function
7. Encoding Method
8. Decoding Method 1. Premise Technique FIG. 1 is a schematic diagram illustrating an n-bit common key block encryption algorithm E corresponding to a k-hit key length. In common key cryptography, plain text P and a key K are inputted, and cipher text C is outputted. The bit length of plain text and cipher text is called the block size, and here is represented by n. Even though n may take on any integer value, normally one value is determined in advance for each block cipher algorithm. A block cipher having a block length n in some cases may be referred to as an n-bit block cipher.

As illustrated in FIG. 1, the bit length of a key K is represented by k. A key K can take on any integer value. A common key block encryption algorithm will correspond to one or a plurality of key sizes. For example, it is assumed that configuration is also possible in which a certain block encryption algorithm A has a block size n=128, and corresponds to a key size of k=128, k=192, or k=256. In the example illustrated in FIG. 1, the plain text P is n bits, the cipher text C is n bits, and the key K is k bits.

Figure 2:
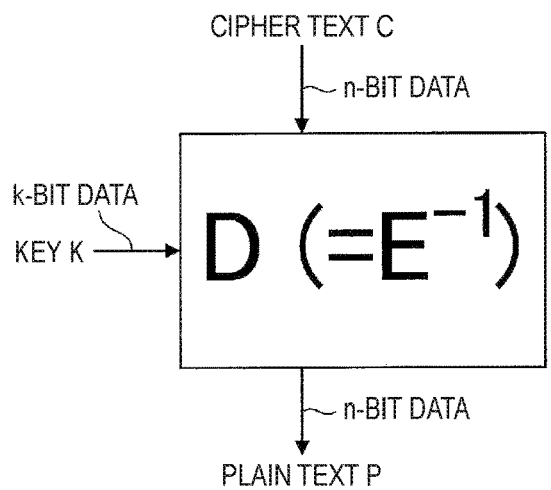
FIG. 2 is a schematic diagram illustrating a decryption algorithm D corresponding to the encryption algorithm E illustrated in FIG. 1.

FIG. 2 is a schematic diagram illustrating a decryption algorithm D corresponding to the encryption algorithm E illustrated in FIG. 1. The decryption algorithm corresponding to the block encryption algorithm E can be defined as the inverse function $E^{-1}$ of the block encryption algorithm E, and receives cipher text C and key K as input, and outputs plain text P.

The block cipher is a function of fixed length n-bit input/output. When encrypting data having a large size that is n bits or more, an encryption function having a large input/output size is created by connecting a plurality of block cipher algorithms E. This is called an encryption mode. As a typical encryption mode there is a. CBC mode. In the case where input data divided in block units is taken to be P1, P2, . . . Pb, cipher text C1, C2, . . . Cb is created in block units as follows. Here, the initialization vector (IV) is an unpredictable public value having the same size as the block size.

$$C1 = P1 \text{ XOR } IV$$

$$Cb = Pb \text{ XOR } Cb-1 \text{ for } b > 1$$

Figure 3:
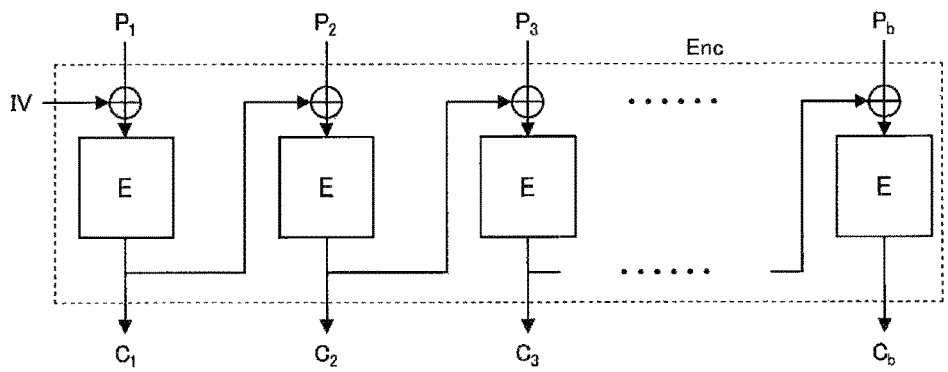
FIG. 3 is a schematic diagram illustrating a CBC mode.
Figure 4:
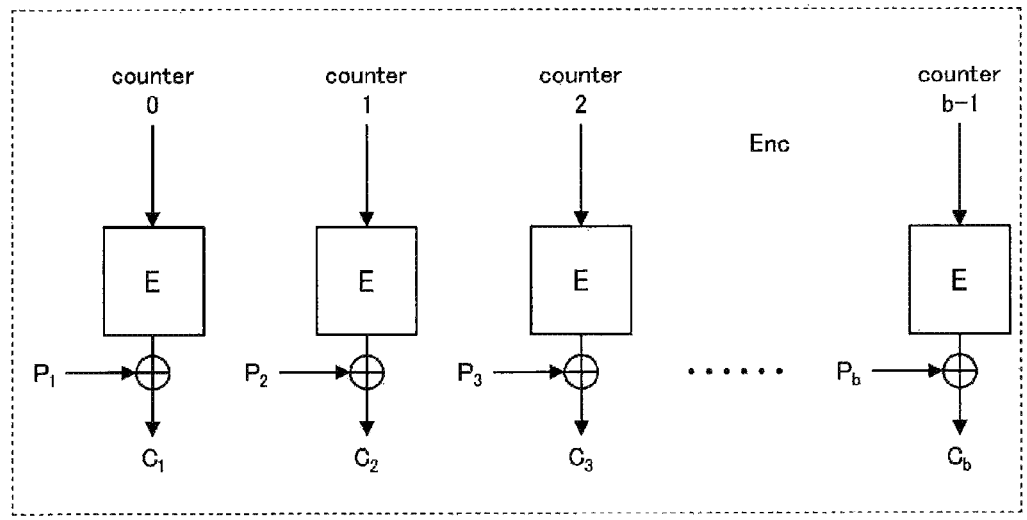
FIG. 4 is a schematic diagram illustrating a counter (CTR) mode.

FIG. 3 is a schematic diagram illustrating a CBC mode. Moreover, FIG. 4 is a schematic diagram illustrating a counter (CTR) mode. Besides these, there are cipher feedback (CFB), output feedback (OFB), and the like as encryption modes. In addition, there is a counter with CBC-MAC (CCM) mode with an alteration detection function, a Galois/Counter Mode (GCM) mode, and the like. An encryption function having an arbitrary size including the mode (where n is a constant multiple) is defined as Enc, and a decryption function is defined as Dec.

As security models of a block cipher there is a blackbox model and a whitebox model. The presumed ability of an attacker and the required security will be described in the following for each model.

The blackbox model is a security model in which an attacker can only access plain text P and cipher text C, which are the input and output of the block encryption algorithm. The types of attackers can be divided into known plain text-cipher text attacks in which only the values of the plain text and cipher text pair are known, and further, selective plain text-cipher text attacks in which the attacker can freely control the values themselves. In the model, the cipher operation itself is securely executed, and it is presumed that the attacker cannot see or alter the intermediate cipher value. The blackbox model corresponds to the case in which hardware support and the like are used, and tamper resistance of the cipher operation can be guaranteed. The method of implementing an encryption algorithm for the blackbox model is called blackbox implementation. Examples of security of the blackbox model include key recovery attack resistance (calculation of the key K is computationally difficult), and identification attack resistance (identifying a block cipher and pseudo random key substitution is computationally difficult).

The whitebox model is a security model that presumes a stronger attacker than in the blackbox model, and is a model that presumes an attacker can freely access not only the plain text P and the cipher text C that are the input and output of the block encryption algorithm, but can also freely access the intermediate values of the operation. It is presumed that an attacker can freely control the plain text P that is the input of the block cipher and the cipher text C, and can see and alter the arbitrary intermediate values during operation. The whitebox model corresponds to cases in which tamper resistance cannot be guaranteed due to implementation restrictions such as all software and the like that does not have hardware support. In addition, the whitebox model also corresponds to cases in which intermediate values are leaked due to vulnerabilities in implementation such as buffer overflow and the like, or malware and the like. The implementation method of the encryption algorithm for the whitebox model will be referred to as whitebox implementation. Examples of whitebox model security include plain text recovery difficulty (finding plain text from cipher text is computationally difficult), and in order to satisfy this security, it is necessary that in the whitebox model one-way-mess be satisfied in which an encryption function E cannot create the decryption function Dec from the encryption function Enc. This one-way-ness will be referred to as whitebox one-way-ness.

Existing Technique 1

Figure 5:
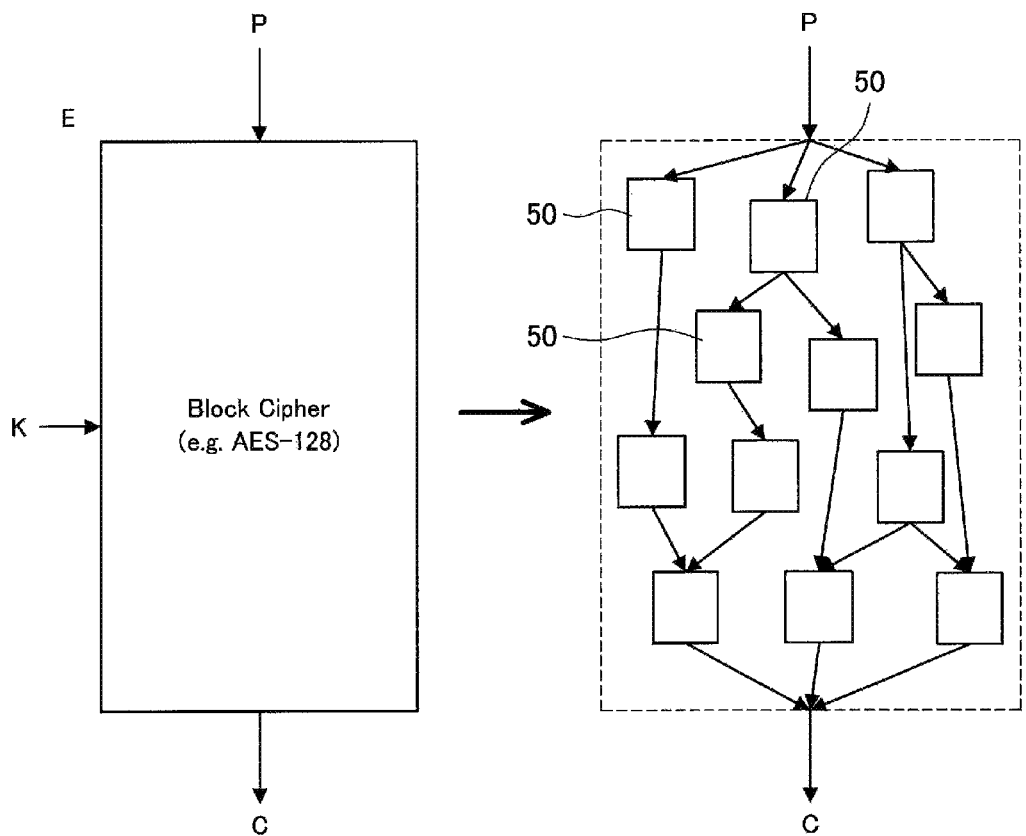
FIG. 5 is a schematic diagram illustrating an example of expressing calculation of the common key block encryption algorithm E by a table reference operation.

In 2002, Chow et al. proposed a method of securely implementing a block cipher DES, AES safely in the whitebox model as well (refer to above-mentioned Non-patent Literature 1 and 2). In this technique, first, as illustrated in FIG. 5, the operation of the common key block encryption algorithm E is expressed by a table reference operation. This method is an approach of creating a block cipher by generating tables 50 from a difficult problem of decomposition, and joining the tables 50.

These methods perform encryption in a whitebox model by table operation. Generally, calculating table reference based operations in the reverse direction is easy. In other words, if an attacker is able to access the encryption function Enc, it is possible to construct a decryption function Dec that is an inverse function. Therefore, in the related technique 1, it is not possible to satisfy whitebox one-way-ness that is the security to be satisfied.

Existing Technique 2

Figure 6:
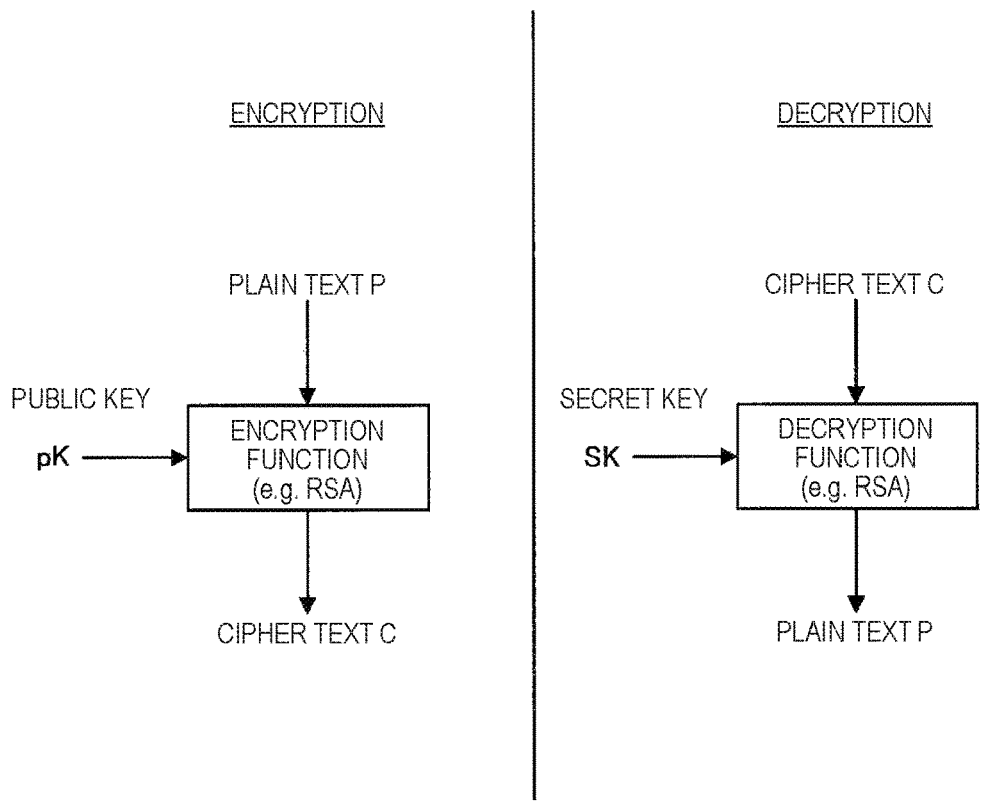
FIG. 6 is a schematic diagram illustrating a public key cryptosystem.

FIG. 6 is a schematic diagram illustrating a public key cryptosystem. In a public key cryptosytem, the encryption (public) key pk and the decryption (secret) key sk are different, and encryption and decryption are performed using the respective keys. Here, in a secure public key cryptosytem, obtaining the decryption key sk from encryption key pk is computationally difficult. Generally, the encryption key is public and used, and the decryption key sk is used as secret information. Therefore, in the existing technique 2, obtaining a decryption function from the encryption function is difficult, and this satisfies the one-way whitebox condition. As specific public key construction methods, RSA, ECC and the like are widely used.

The existing method 2 satisfies the security requirement in the whitebox model, however, performance is extremely bad, and when compared to the widely used common key method, the processing time becomes several hundred times to several thousand times slower. Therefore, as a real application, it may not be possible to encrypt large data.

Existing Technique 3 (Hybrid Cryptosystem)

Figure 7:
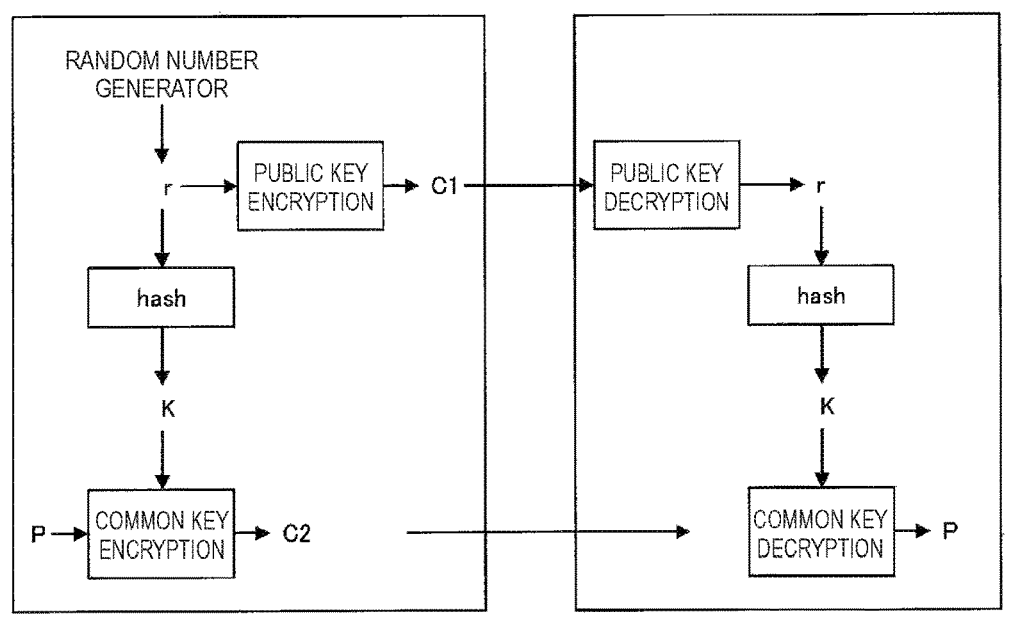
FIG. 7 is a schematic diagram illustrating a hybrid cryptosystem.

FIG. 7 is a schematic diagram illustrating a hybrid cryptosystem. This method combines the public key cryptosystem and secret key cryptosystem, and is a method of generating a secret key K for a common key block cipher for each encryption using a random number generator and hash function. In this method, before being hashed, the value of the secret key K for a common key block cipher for a small data size is encrypted by the public key cryptosystem, and encryption of actual data is performed by a high-speed common key cryptosystem. At the time of decryption, the secret key K for a common key block cipher is obtained by a decryption function and hash function of a public key cipher. After that, actual data is decrypted with the decrypted secret key K for a common block cipher.

In the existing method 3, a secret key for the common key is generated each time from a random number generator. The random number generator can be divided onto a pseudo random number algorithm and a true random number generator. In a pseudo random number generator, a random number is generated on the basis of secret information called a seed. Therefore, in the whitebox model, the secret seed is visible to an attacker, and the algorithm is public, so the attacker can predict the random number output. In other words, the attacker can predict the secret key K for the common key, so can easily construct the decryption function.

In the case where true random number generation is used, there is no problem with security such as described above, however, the hardware of the true random number generator is necessary. In the first place, the whitebox model is a system that maintains security even in the case of being entirely executed by software, so the case where hardware is prepared contradicts the problem that is assumed by the whitebox model. In addition, the cost of introducing an efficient and secure true random number generator becomes very high.

As described above, existing techniques 1 and 3 are not able to satisfy the required security (whitebox one-way-ness). Moreover, the existing technique 2 satisfies security, however, the performance is extremely bad, and may not be able to be used in an actual environment or use case.

2. Basic Configuration Example of the Embodiment

Figure 8:
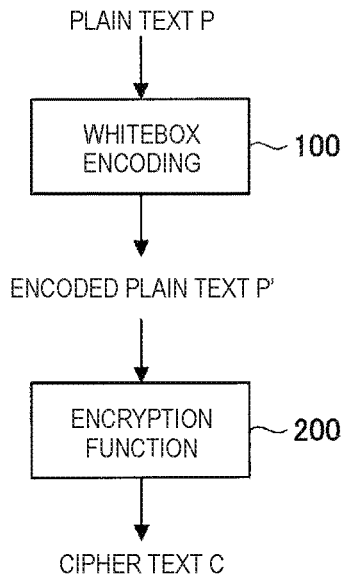
FIG. 8 is a schematic diagram illustrating a basic configuration of an embodiment.

FIG. 8 is a schematic diagram illustrating a basic configuration of an embodiment. The whitebox encoding function 100 according to this embodiment is an encoding method configured from a trapdoor one-way function, and a special property, and achieves the establishment of the property of whitebox one-way-ness. By placing this before an encryption function 200 that performs an arbitrary block cipher operation, it is possible to give the property of whitebox one-way-ness to the encryption function (Enc) 200.

3. Configuration Example of the Embodiment

Figure 9:
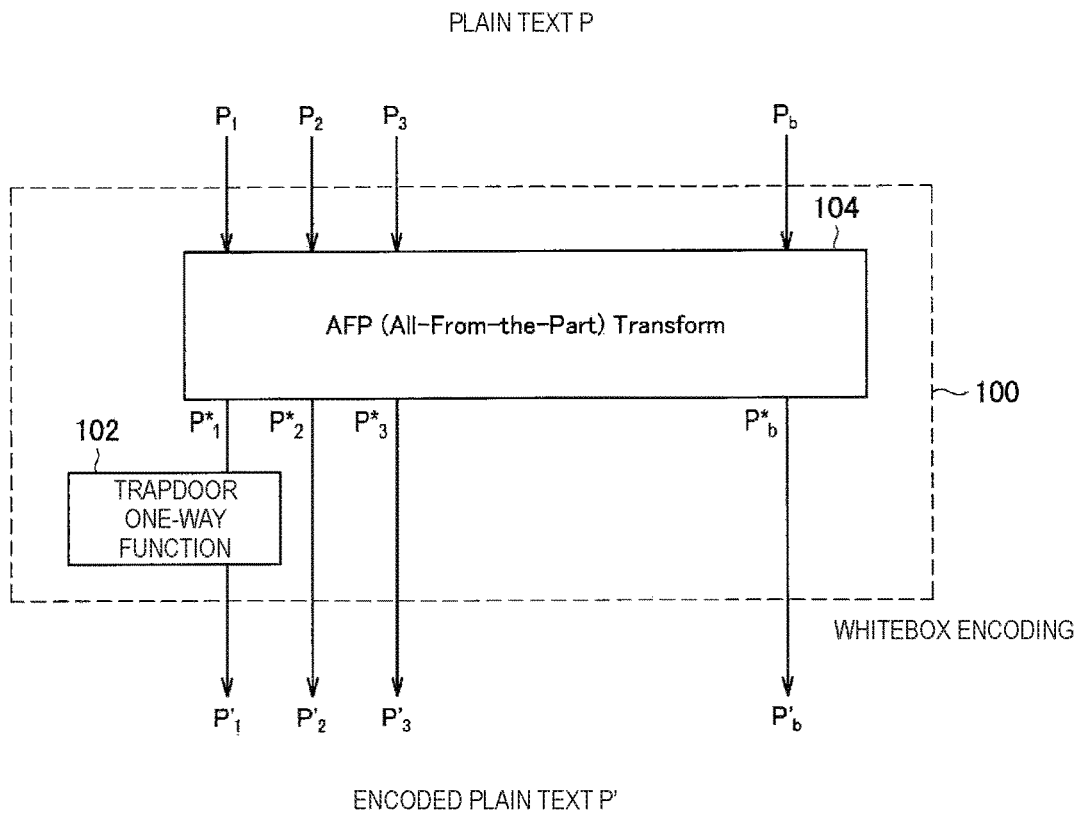
FIG. 9 is a schematic diagram illustrating a configuration of a whitebox encoding function.

FIG. 9 is a schematic diagram illustrating a configuration of a whitebox encoding function 100. As illustrated in FIG. 9, in the whitebox encoding function 100, the encoding function is configured from a trapdoor one-way function 102, and a conversion function having a special property (All-from-the-Part Transform) 104. Specifically, as illustrated in FIG. 9, plain text P is inputted to the conversion function having a special property 104, and part of that output P*1 is inputted to the trapdoor one-way function 102. The output of the trapdoor one-way function 102 and the remaining output of the conversion function having a special property 104 are taken to be the output of the whitebox encoding function 100. By performing this operation before the input of the encryption function 200, it is possible to give whitebox one-way-ness to an arbitrary block cipher.

4. Trapdoor One-Way Function

The trapdoor one-way function 102, is a function in which operation in the forward direction is easy, however, is a function in which operation in the reverse direction is computationally difficult as long as the "trapdoor" is not known. However, in the case that the trapdoor is known, is a function in which operation in the reverse direction as well can be easily calculated. For example, a RSA function is a typical trapdoor function. In a RSA function, operation in the forward direction is performed using a public key pk, and operation in the reverse direction is performed using a secret key sk. The secret key corresponds to the trapdoor, and obtaining the secret key sk from the public key pk is computationally difficult. In addition, as a trapdoor one-way function, there are the Rabin-Williams or the Kurosawa-Itoh-Takeuchi cryptosystems, Dickson polynomials, and the like. Here, the input size and output size of the trapdoor one-way function 102 are defined as nin and nout.

5. Conversion Function Having a Special Property

The conversion function having a special property 104 is a public function that does not include a secret key, and is a function that satisfies the following property 1 when the input blocks are taken to be $X1, X2, X3, \ldots, Xb$, and the output blocks are taken to be $Y1, Y2, Y3, \ldots, Yb$.

(Property 1) When h−1 output blocks $Y2, Y3, \ldots, Yb$, and one arbitrary input block (any one of $X1, X2, X3, \ldots, Xb$) are given, it is possible to definitively determine all of the input and output. For example, when $Y2, Y3, \ldots, Yb$ and $X3$ are given, it is possible to calculated $Y1$ and the remaining X by computation amount 1. Note that, $X1, X2, X3, \ldots, Xb$ correspond to P1, P2, P3, ..., Pb in FIG. 9, and $Y1, Y2, Y3, Yb$ correspond to P*1, P*2, P*3, P*b in FIG. 9.

As illustrated in FIG. 9, the whitebox encoding function 100 is configured from a conversion function having a special property 104 and a trapdoor one-way function 102. Plain text P1, P2, P3, ..., Pb divided for each block are taken to be the input of the conversion function having a special property 104, and P*1, P*2, P*3, ..., P*b are taken to be the output. Here, one block of output is taken to be the input of the trapdoor one-way function 102. In the case in FIG. 9, one block of output P*1 becomes the input of the trapdoor one-way function 102. Output P*2, P*3, ..., P*n other than P*1 and the output of the trapdoor one-way function 102 become the output P'1, P'2, P'3, P'b of the whitebox encoding function 100.

Figure 10:
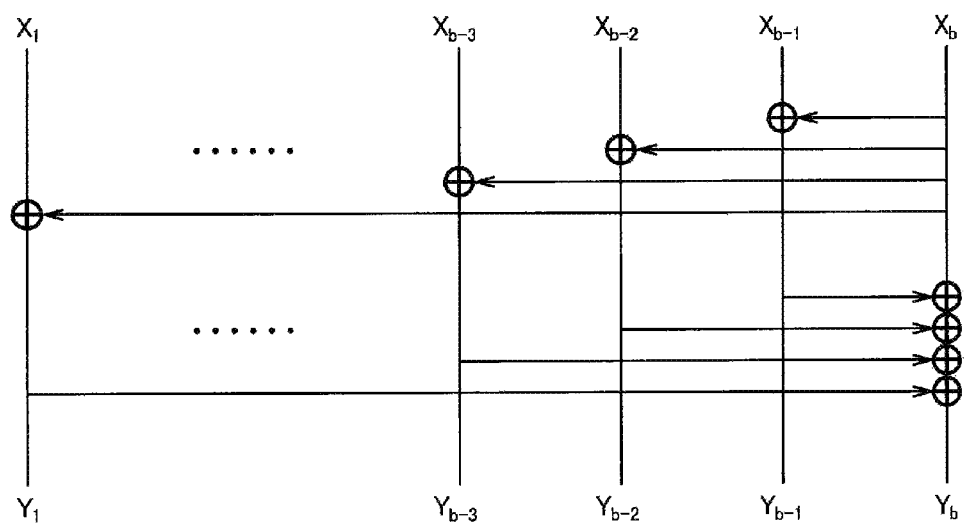
FIG. 10 is a schematic diagram illustrating a specific configuration of a conversion function.

FIG. 10 to FIG. 14 are schematic diagrams illustrating a specific configuration of the conversion function having a special property 104. The configuration illustrated in FIG. 10 is configuration of only an XOR operation, and can be expressed by the following relational expressions.

$$Yi = Xi \text{ XOR } Xb (1 \leq i \leq n-1)$$

$$Yn = (Xb \text{ XOR}(b \bmod 2)) X1 \text{ XOR } X2 \text{ XOR } X3 \text{ XOR } X4 \text{ XOR } \ldots \text{ XOR } Xb-1$$

Figure 11:
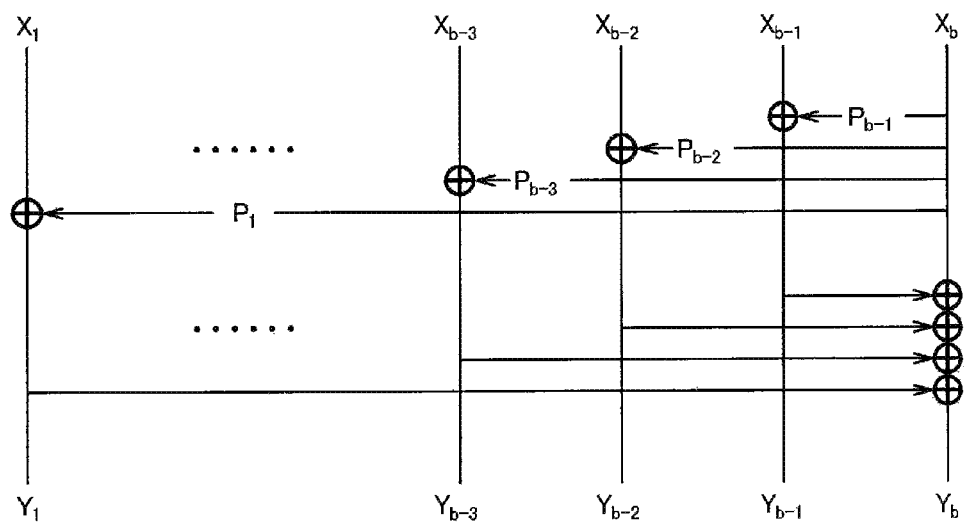
FIG. 11 is a schematic diagram illustrating a specific configuration of a conversion function.

The configuration illustrated in FIG. 11 is the configuration illustrated in FIG. 10 to which nonlinear functions P1, . . . Pb−3, Pb−2, Pb−1 are added. The configuration illustrated in FIG. 11 can be expressed by the following relational expressions.

$$Yi = Xi \text{ XOR } Pi(Xb)(1 \leq i \leq n-1)$$

$$Yn = (P1(Xb) \text{XOR } P2(Xb) \text{XOR } \ldots \text{ XOR } Pn-1(Xb)) \text{ XOR } X2 \text{ XOR } X3 \text{ XOR } X4 \text{ XOR } \ldots \text{ XOR } Xb$$

Here, Pi is a pseudo random substitution of n-bit input/output.

Figure 12:
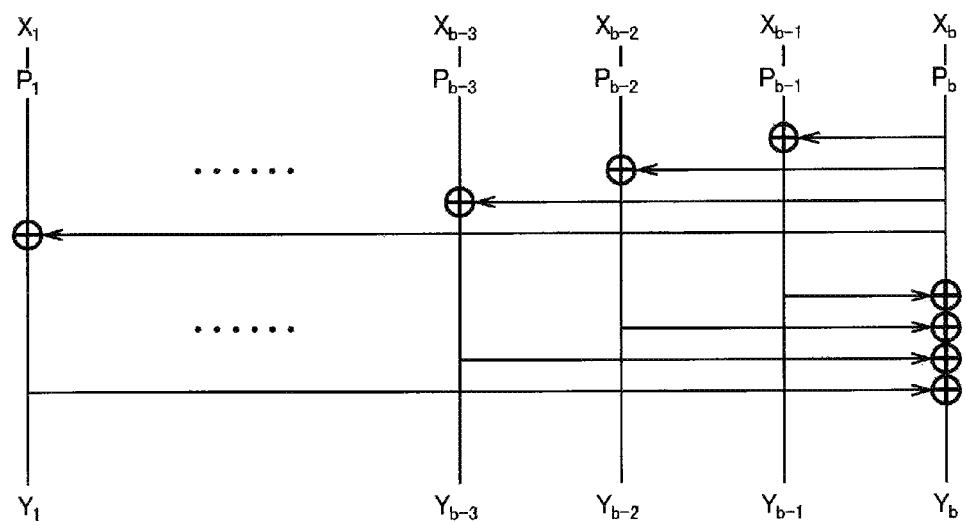
FIG. 12 is a schematic diagram illustrating a specific configuration of a conversion function.

The configuration illustrated in FIG. 12 is the configuration illustrated in FIG. 10 to which nonlinear functions P1, . . . Pb−3, Pb−2, Pb−1 are added. The configuration illustrated in FIG. 12 can be expressed by the following relational expressions.

$$Yi = Pi(Xi) \text{XOR } Xb (1 \leq i \leq n-1)$$

$$Yn(Pb(Xb) \text{XOR } (b \bmod 2)) Pi(X1) \text{XOR } Pi(X2) \text{XOR } Pi(X3) Pi(X4) \text{XOR } \ldots \text{ XOR } Pi(Xb-1)$$

Here, Pi is a pseudo random substitution of n-bit input/output.

Figure 13:
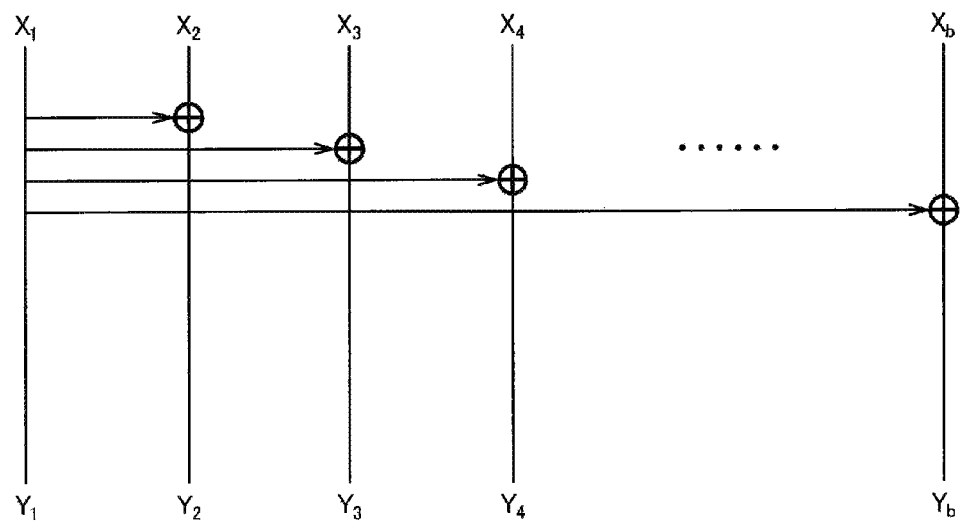
FIG. 13 is a schematic diagram illustrating a specific configuration of a conversion function.

The configuration illustrated in FIG. 13 is the most basic configuration example of only an XOR operation and can be expressed by the following relational expressions.

$$Y1 = X1$$

$$Yi = X1 \text{ XOR } Xi (2 \leq i \leq n)$$

Figure 14:
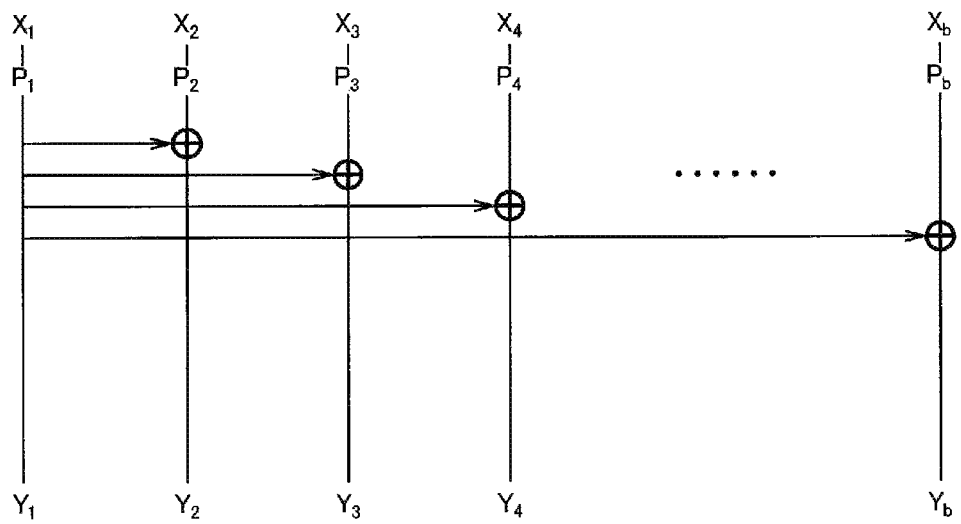
FIG. 14 is a schematic diagram illustrating a specific configuration of a conversion function.

The configuration illustrated in FIG. 14 is the configuration illustrated in FIG. 13 to which nonlinear functions P1, . . . P2, P3, Pb are added. The configuration illustrated in FIG. 14 can be expressed by the following relational expressions.

$$Y1 = P1(X1)$$

$$Yi = P1(X1) \text{XOR } Pi(Xi)(2 \leq i \leq n)$$

Here, Pi is an independent pseudo random substitution of n-bit input/output.

Figure 20:
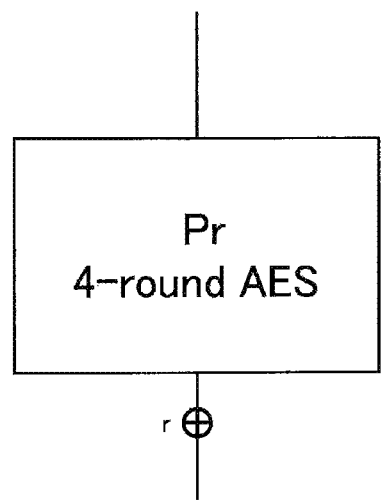
FIG. 20 is a schematic diagram illustrating an example of a configuration that XORs the count value in output of common pseudo random substitution.
Figure 21:
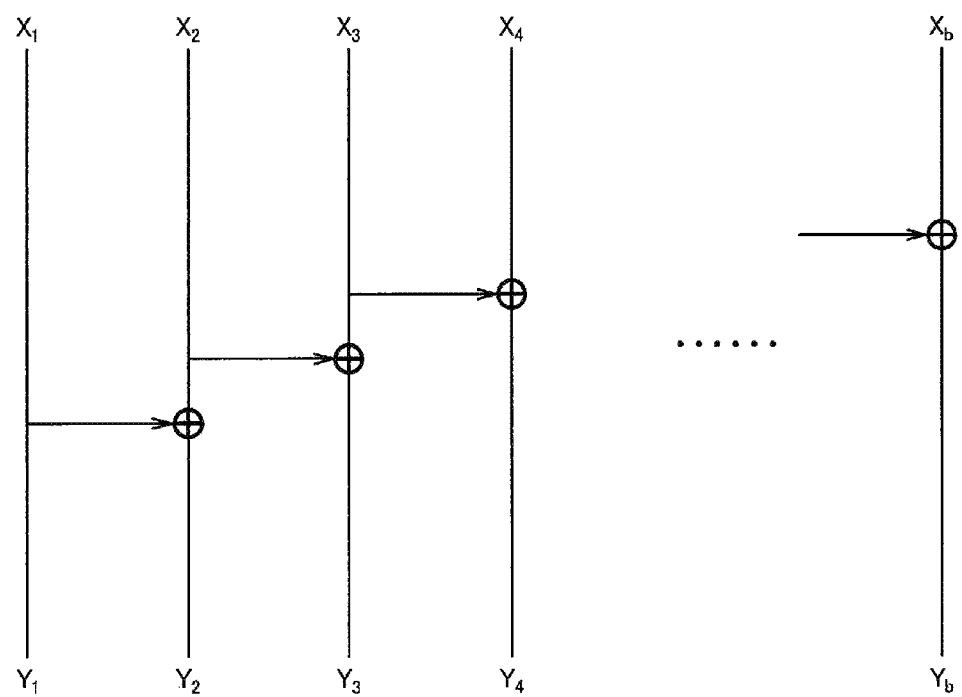
FIG. 21 is a schematic diagram illustrating a specific configuration of a conversion function.
Figure 22:
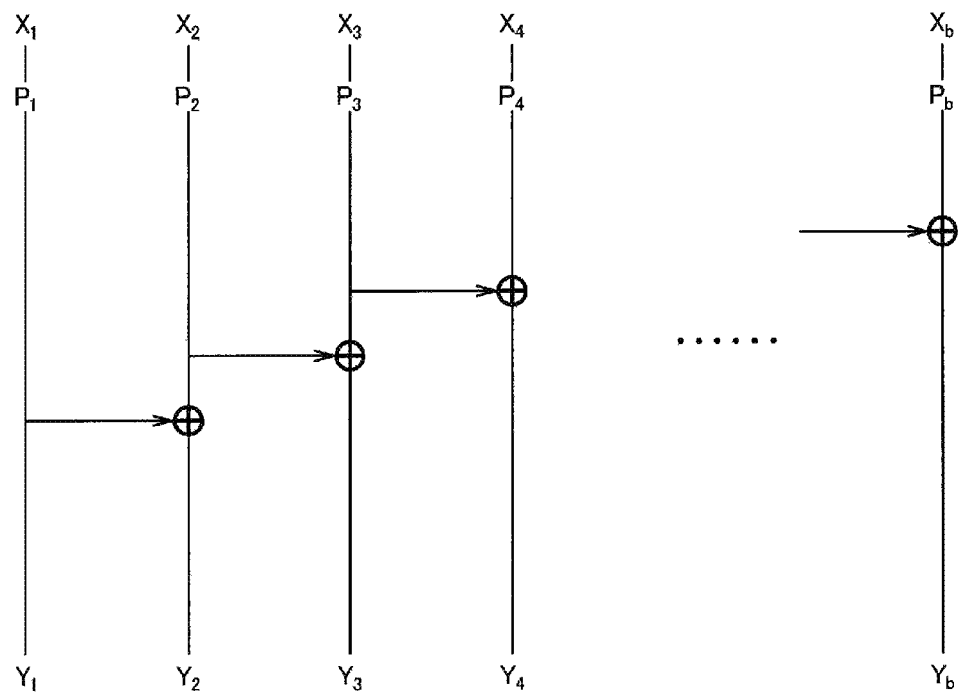
FIG. 22 is a schematic diagram illustrating a specific configuration of a conversion function.
Figure 23:
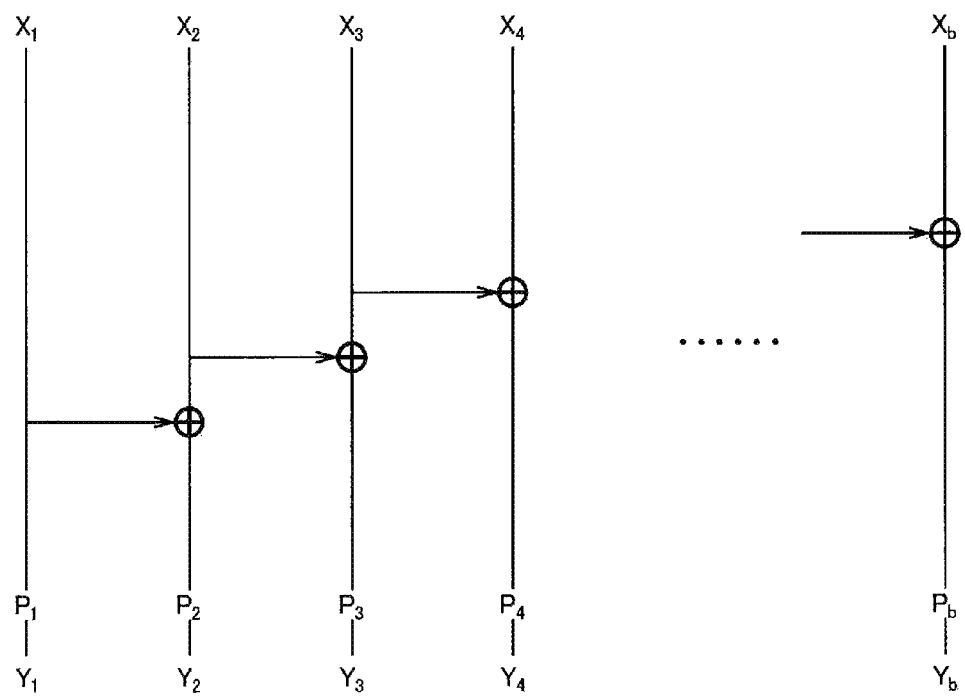
FIG. 23 is a schematic diagram illustrating a specific configuration of a conversion function.
Figure 24:
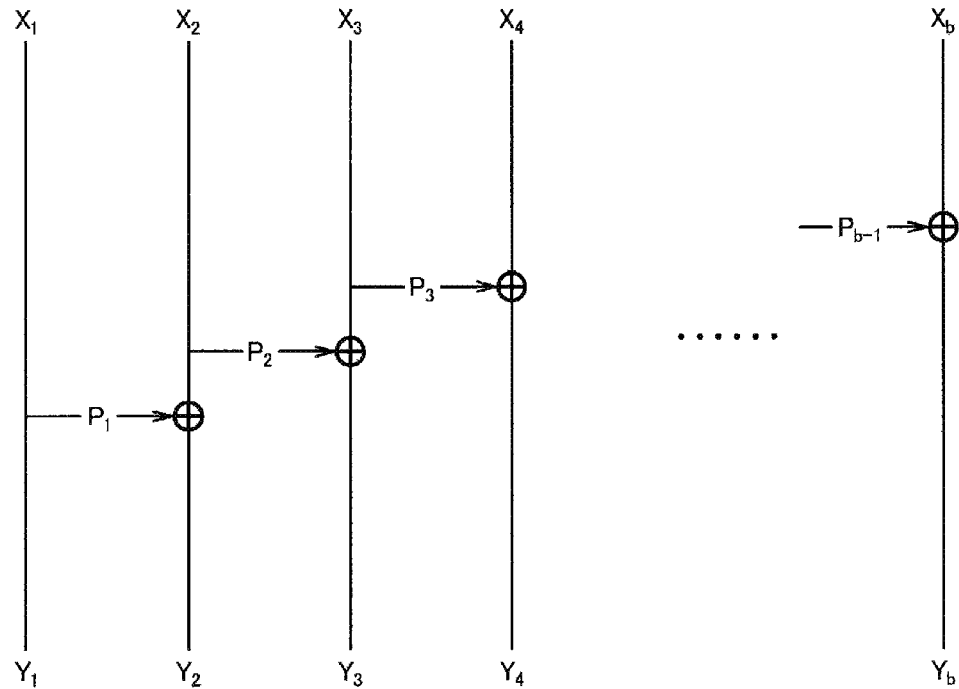
FIG. 24 is a schematic diagram illustrating a specific configuration of a conversion function.
Figure 25:
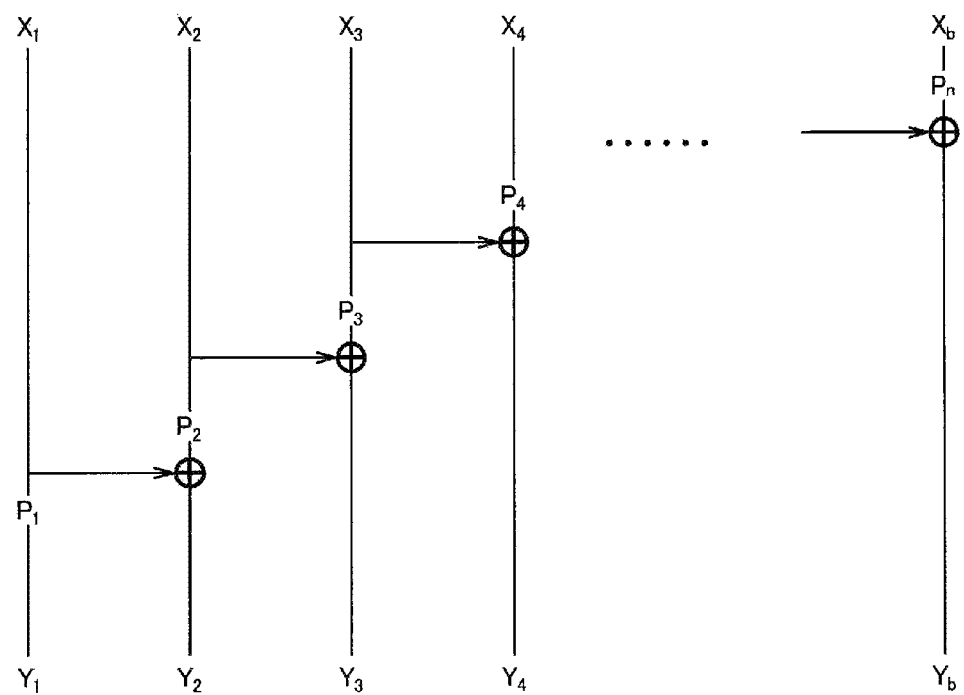
FIG. 25 is a schematic diagram illustrating a specific configuration of a conversion function.

In pseudo random substitution, a substitution function can be configured from a block cipher by substituting a fixed public value in for the secret key. As an efficient configuration method is a method that reduces the AES of a 128-bit AES key to 4 rounds. Even in 4 rounds there are sufficient properties as a nonlinear function. In addition, as illustrated in FIG. 20, in order to make the function an independent function, pseudo random conversion may also be configured by XORing the count value r with the output of the common pseudo random conversion. FIG. 21 to FIG. 25 are schematic diagrams illustrating yet another specific configuration of the conversion function having a special property 104. In FIG. 21 to FIG. 25 as well, the input blocks are taken to be X1, X2, X3, . . . , Xb, and the output blocks are taken to be Y1, Y2, Y3, . . . , Yb. Moreover, in the configuration example illustrated in FIG. 22 to FIG. 25, pseudo random substitution Pi independent of the input and output is provided.

6. Specific Configuration Example of a Whitebox Encoding Function

Figure 15:
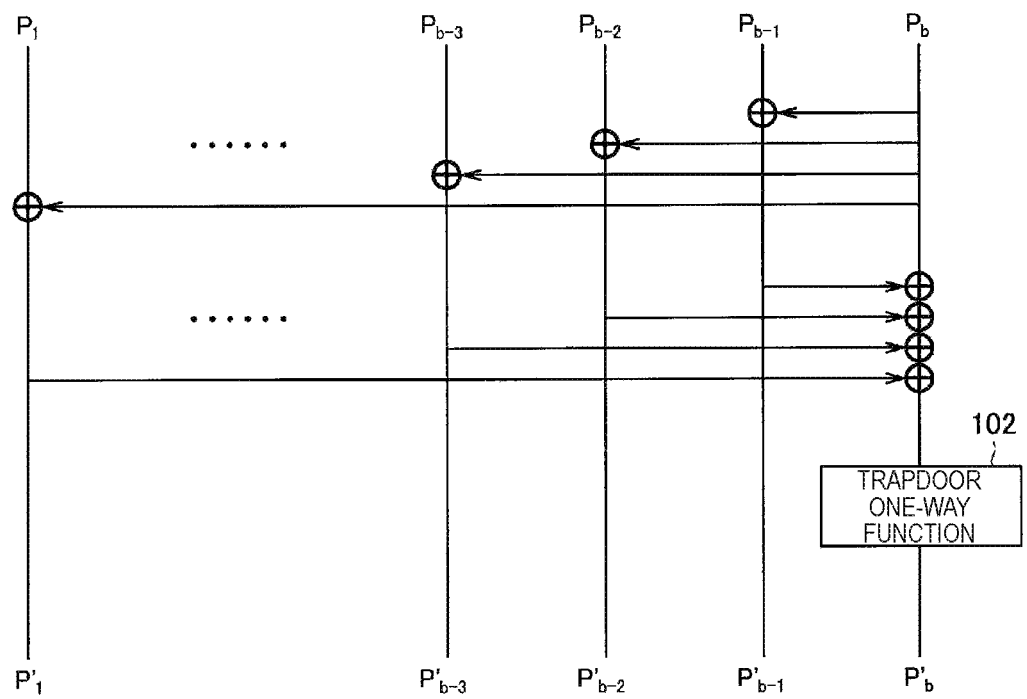
FIG. 15 is a schematic diagram illustrating a specific configuration of a whitebox encoding function 100.
Figure 16:
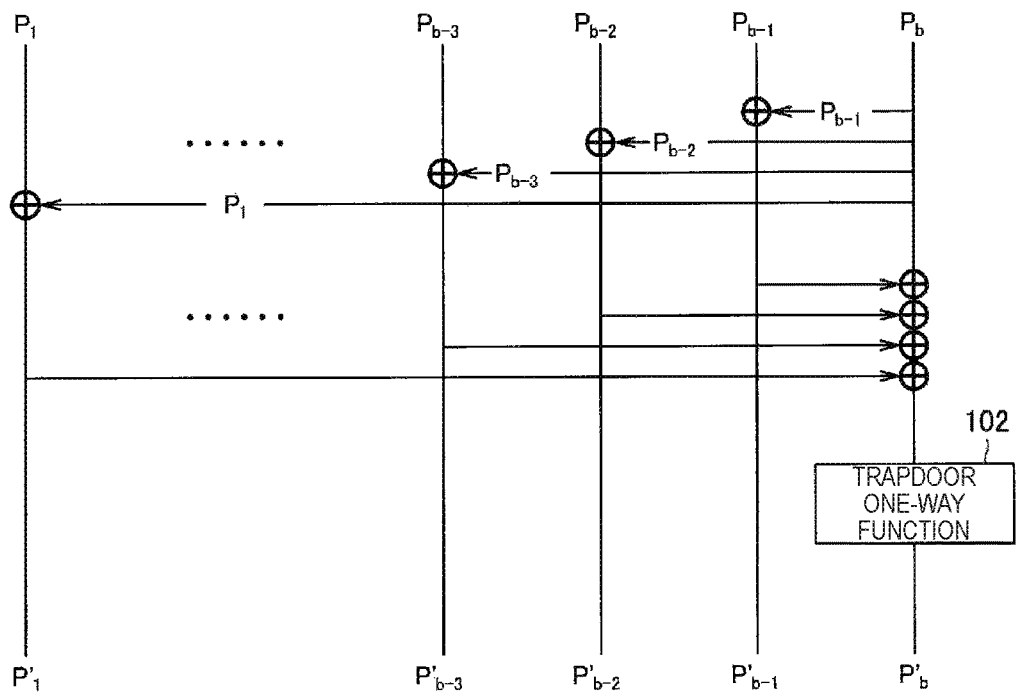
FIG. 16 is a schematic diagram illustrating a specific configuration of a whitebox encoding function 100.
Figure 17:
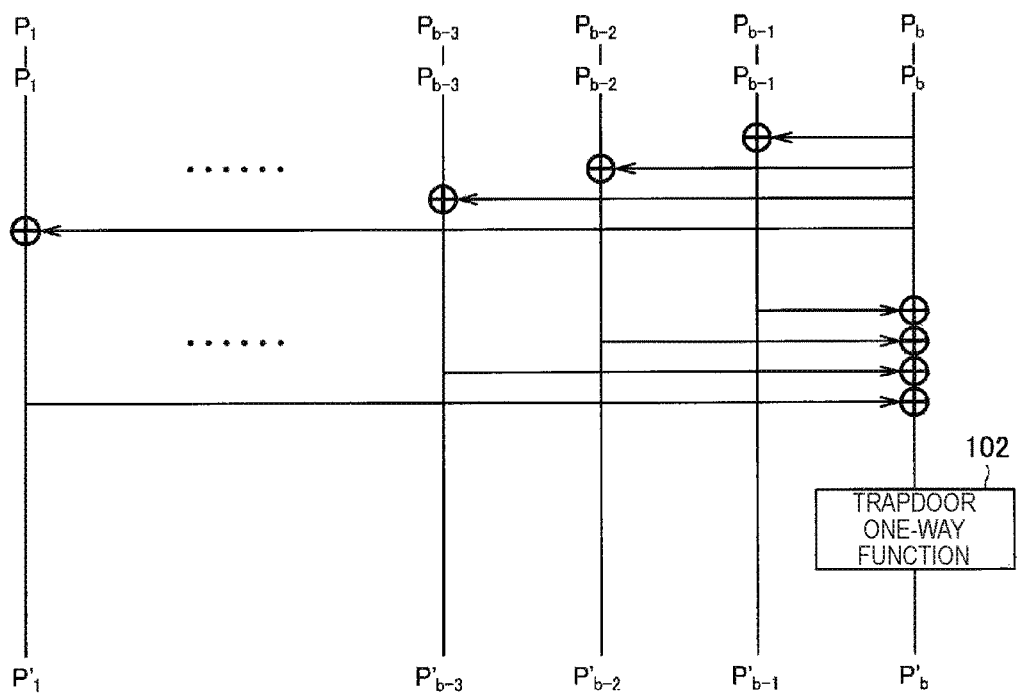
FIG. 17 is a schematic diagram illustrating a specific configuration of a whitebox encoding function 100.
Figure 18:
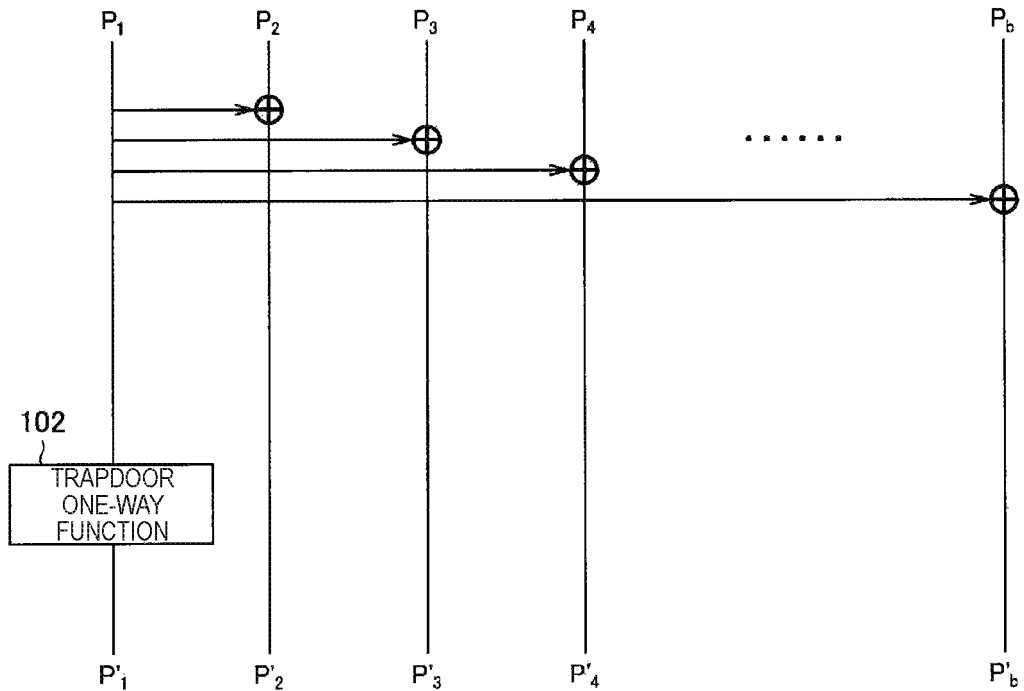
FIG. 18 is a schematic diagram illustrating a specific configuration of a whitebox encoding function 100.
Figure 19:
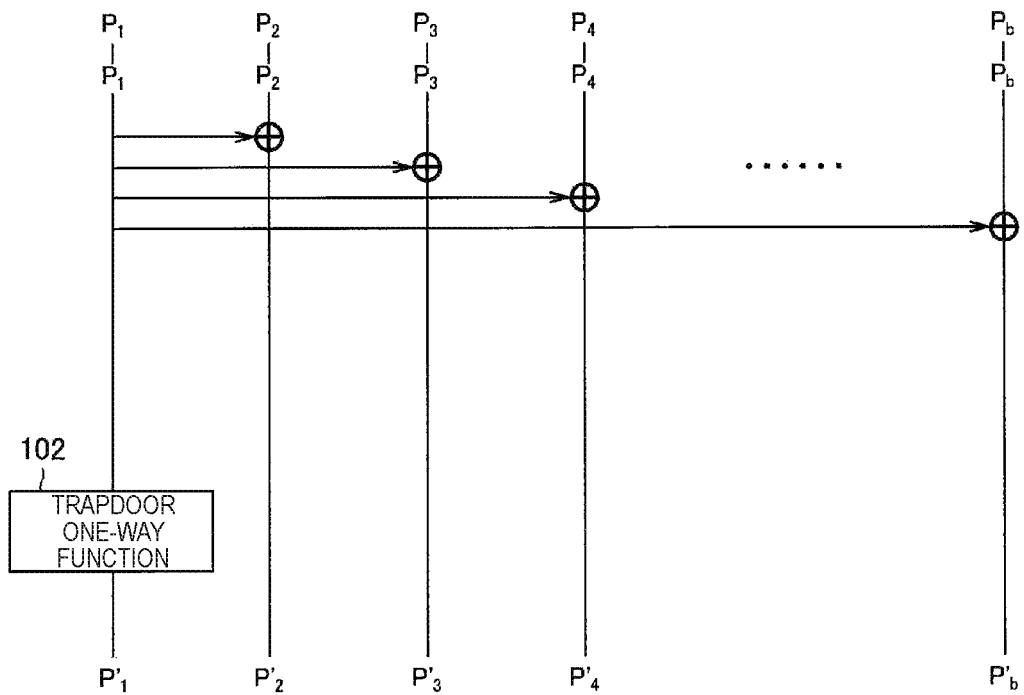
FIG. 19 is a schematic diagram illustrating a specific configuration of a whitebox encoding function 100.

FIG. 15 to FIG. 19 are schematic diagrams illustrating specific configuration of a whitebox encoding function 100. FIG. 15 illustrates the configuration illustrated in FIG. 10 to which a trapdoor one-way function 102 is added. FIG. 16 illustrates the configuration illustrated in FIG. 11 to which a trapdoor one-way function 102 is added. FIG. 17 illustrates the configuration illustrated in FIG. 12 to which a trapdoor one-way function 102 is added. FIG. 18 illustrates the configuration illustrated in FIG. 13 to which a trapdoor one-way function 102 is added. FIG. 19 illustrates the configuration illustrated in FIG. 14 to which a trapdoor one-way function 102 is added.

7. Encoding Method

The encoding method in the whitebox encoding function 100 is as follows. First, plain text P is divided for each n-bit block. Next, an operation by a conversion function 104 is performed on the blocks of plain text P as input. Next, one specific block of output is inputted to a trapdoor one-way function 102, and calculation is performed. Here, operation of the trapdoor one-way function 102 is performed using a public key. Next, the output of the trapdoor one-way function 102 and the remaining output of the conversion function 104 are generated as a cipher text.

8. Decoding Method

Furthermore, the decoding method (decryption) by a decoding function in the reverse direction to the whitebox encoding function 100 is as follows. First, the cipher text C is divided for each n-bit block. Next, a specific block of cipher text is calculated as input of the inverse function of trapdoor one-way function 102. Here, the inverse function of the trapdoor one-way function 102 is calculated using a secret key which is a trapdoor. Next, the inverse function of the conversion function 104 is calculated with the output of the inverse function of the trapdoor one-way function and the remaining cipher text blocks as input. Then, the output of the inverse function of the conversion function 104 is taken to be plain text P.

According to the present embodiment, it is possible to satisfy whitebox one-way-ness that could not be satisfied by the existing techniques 1 and 3. More specifically, it is possible to prove that obtaining plain text from randomly given cipher text is equivalent to or more difficult than breaking the trapdoor one-way function 102

Furthermore, in the whitebox model, it is not possible to create a decryption function Dec of any one plain text block from the encryption function Enc. This guarantees that obtaining even one block of plain text from randomly given cipher text is difficult. In this way, it is possible to prove that stronger security is also similarly secure. Moreover, even in the case of attaching an encoding function, it is possible to save the properties possessed by the block cipher function.

The existing technique 2 is able to satisfy whitebox one-way-ness, however, the very bad performance is a disadvantage. For the encryption of b blocks, the existing technique 2 requires b number of RSA operations, however, in the case of using the CBC mode as the encryption function, according to this embodiment, there is one RSA operation and N number of block cipher operations. In the case where the b value is sufficiently large, the cost of the respective RSA operation and block cipher operations becomes dominant, and the proposed scheme becomes hundreds of times faster.

The method of this embodiment is executed on plain text P that is inputted into the encryption function. In other words, the method is executed independently of the encryption function, so basically, can be applied to most cipher functions (AES, CLEFIA) and encryption modes (CBC, CTR mode). In addition, changes are not necessary for the implementation of encryption functions, so can be applied as a wrapper for existing libraries.

The preferred embodiments of the present disclosure has been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An encryption device including:

a conversion function having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values; and the trapdoor one-way function having a property of encrypting a part of the plurality of output values, and not being able to decrypt encrypted data in a state in which a trapdoor is unknown.

(2)

The encryption device according to (1), in which the conversion function has, as the predetermined relationship, a relationship of determining all of the plurality of input values and all of the plurality of output values when the output values of the plurality of output values that are not inputted to the trapdoor one-way function and the one arbitrary input value of the plurality of input values are determined.

(3)

The encryption device according to (1) or (2), further including an encryption function that encrypts encrypted output values that are inputted to the trapdoor one-way function, and output values at a e not inputted to the one-way function.

(4)

The encryption device according to any of (1) to (3), in which the conversion function takes a b number of values that include a b−1 number of values obtained by respectively performing an exclusive OR operation of one specific value of a b number of the plurality of input values and another b−1 number of input values, and the one specific input value to be the plurality of output values.

(5)

The encryption device according to (4), in which the specific input value is inputted as is to the trapdoor one-way function.

(6)

The encryption device according to (4), in which the conversion function includes a nonlinear function that performs random substitution for each of the plurality of input values.

(7)

The encryption device according to any of (1) to (3), in which the conversion function takes a b number of output values that include a b−1 number of output values obtained by respectively performing an exclusive OR operation of one specific value of a b number of the plurality of input values and another b−1 number of input values, and one specific output value obtained by sequentially performing an exclusive OR operation of the specific one input value and the b−1 number of output values to be the plurality of output values.

(8)

The encryption device according to (7), in which the specific one output value is inputted to the trapdoor one-way function.

(9)

The encryption device according to (7), in which the conversion function includes a nonlinear function that performs random substitution for each of the plurality of input values.

(10)

The encryption device according to (7), in which the conversion function includes a nonlinear function that before respectively performing an exclusive OR operation of the specific one input value and the other b−1 number of input values, performs random substitution of the specific one input value that is exclusively ORed with the other b−1 number of input values.

(11)

The encryption device according to any of (1) to (10), in which the trapdoor one-way function is RSA.

(12)

An encryption method including:

having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values; and having a property of encrypting a part of the plurality of output values according to the trapdoor one-way function, and the trapdoor one-way function not being able to decrypt encrypted data in a state in which a trapdoor is unknown.

(13)

A decryption device including:

a decryption unit that decrypts a plurality of input values and outputs a plurality of output values configured of plain text, in which the decryption unit performs decryption by an inverse operation of a conversion function having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values, and the trapdoor one-way function having a property of encrypting a part of the plurality of output values, and not being able to decrypt encrypted data in a state in which a trapdoor is unknown.

(14)

A decryption method, including:

decrypting a plurality of input values and outputting a plurality of output values configured of plain text, in which the decryption method performs decryption by an inverse operation of a conversion function having a predetermined relationship that outputs a plurality of output values according to a plurality of input values configured of plain text, with a part of the plurality of output values being inputted to a trapdoor one-way function, the predetermined relationship being defined by the output values that are not inputted to the trapdoor one-way function and one arbitrary input value of the plurality of input values, and the trapdoor one-way function having a property of encrypting a part of the plurality of output values, and not being able to decrypt encrypted data in a state in which a trapdoor is unknown.

REFERENCE SIGNS LIST

100 whitebox encoding function
102 trapdoor one-way function
104 conversion function
200 encryption function

The invention claimed is:

1. An encryption device comprising:
hardware configured to
perform a conversion function having a predetermined relationship that outputs a plurality of output values configured of plain text according to a plurality of input values configured of plain text, wherein the plurality of input values are divided into parts of the plain text and the plurality of output values are converted into parts, with a part of the plurality of output values being inputted to a trapdoor one-way function, the predetermined relationship being defined by which converted parts of the plurality of output values are not inputted to the trapdoor one-way function and one arbitrary input value of the plurality of input values; and
perform the trapdoor one-way function having a property of encrypting the part of the plurality of output values, and not being able to decrypt encrypted data in a state in which a trapdoor is unknown.

2. The encryption device according to claim 1, wherein the conversion function has, as the predetermined relationship, a relationship of determining all of the plurality of input values and all of the plurality of output values when the output values of the plurality of output values that are not inputted to the trapdoor one-way function and the one arbitrary input value of the plurality of input values are determined.

3. The encryption device according to claim 1, wherein the hardware is further configured to perform an encryption function that encrypts encrypted output values including the part that is inputted to the trapdoor one-way function, and the converted parts of the plurality of output values that are not inputted to the trapdoor one-way function.

4. The encryption device according to claim 1, wherein the conversion function takes a b number of values that include a b−1 number of values obtained by respectively performing an exclusive OR operation of one specific value of a b number of the plurality of input values and another b−1 number of input values, and the one specific input value to be the plurality of output values.

5. The encryption device according to claim 4, wherein the specific input value is inputted as is to the trapdoor one-way function.

6. The encryption device according to claim 4, wherein the conversion function includes a nonlinear function that performs random substitution for each of the plurality of input values.

7. The encryption device according to claim 1, wherein the conversion function takes a b number of output values that include a b−1 number of output values obtained by respectively performing an exclusive OR operation of one specific value of a b number of the plurality of input values and another b−1 number of input values, and one specific output value obtained by sequentially performing an exclusive OR operation of the specific one input value and the b−1 number of output values to be the plurality of output values.

8. The encryption device according to claim 7, wherein the specific one output value is inputted to the trapdoor one-way function.

9. The encryption device according to claim 7, wherein the conversion function includes a nonlinear function that performs random substitution for each of the plurality of input values.

10. The encryption device according to claim 7, wherein the conversion function includes a nonlinear function that before respectively performing an exclusive OR operation of the specific one input value and the other b−1 number of input values, performs random substitution of the specific one input value that is exclusively ORed with the other b−1 number of input values.

11. The encryption device according to claim 1, wherein the trapdoor one-way function is RSA.

12. An encryption method comprising:
performing a conversion function having a predetermined relationship that outputs a plurality of output values configured of plain text according to a plurality of input values configured of plain text, wherein the plurality of input values are divided into parts of the plain text and the plurality of output values are converted into parts, with a part of the plurality of output values being inputted to a trapdoor one-way function, the predetermined relationship being defined by which converted parts of the plurality of output values are not inputted to the trapdoor one-way function and one arbitrary input value of the plurality of input values; and
performing the trapdoor function having a property of encrypting the part of the plurality of output values according to the trapdoor one-way function, and the trapdoor one-way function not being able to decrypt encrypted data in a state in which a trapdoor is unknown.

13. A decryption device comprising:
hardware configured to decrypt a plurality of input values configured of plain text and outputs a plurality of output values configured of plain text, wherein the plurality of input values are divided into parts of the plain text and the plurality of output values are converted into parts,
wherein the hardware performs decryption by an inverse operation of a conversion function having a predetermined relationship that outputs the plurality of output values according to the plurality of input values configured of plain text, with a part of the plurality of output values being inputted to a trapdoor one-way function, the predetermined relationship being defined by which converted parts of the plurality of output values are not inputted to the trapdoor one-way function and one arbitrary input value of the plurality of input values,
wherein the trapdoor one-way function has a property of encrypting the part of the plurality of output values, and not being able to decrypt encrypted data in a state in which a trapdoor is unknown.

14. A decryption method, comprising:
decrypting a plurality of input values configured of plain text and outputting a plurality of output values configured of plain text, wherein the plurality of input values are divided into parts of the plain text and the plurality of output values are converted into parts,
wherein the decryption method performs decryption by an inverse operation of a conversion function having a predetermined relationship that outputs the plurality of output values according to the plurality of input values configured of plain text, with a part of the plurality of output values being inputted to a trapdoor one-way function, the predetermined relationship being defined by which converted parts of the plurality of output values are not inputted to the trapdoor one-way function and one arbitrary input value of the plurality of input values, and
wherein the trapdoor one-way function has a property of encrypting the part of the plurality of output values, and not being able to decrypt encrypted data in a state in which a trapdoor is unknown.

* * * * *